(12) United States Patent
Biehler

(10) Patent No.: US 9,448,549 B2
(45) Date of Patent: Sep. 20, 2016

(54) METHOD OF OPERATING AN AUTOMATION SYSTEM

(71) Applicant: Georg Biehler, Nürnberg (DE)

(72) Inventor: Georg Biehler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 424 days.

(21) Appl. No.: 14/164,837

(22) Filed: Jan. 27, 2014

(65) Prior Publication Data

US 2014/0214179 A1   Jul. 31, 2014

(30) Foreign Application Priority Data

Jan. 28, 2013   (EP) .................................... 13152891

(51) Int. Cl.
| | |
|---|---|
| *G06F 9/44* | (2006.01) |
| *H04L 12/40* | (2006.01) |
| *G05B 15/02* | (2006.01) |
| *G05B 19/042* | (2006.01) |

(52) U.S. Cl.
CPC ........... *G05B 15/02* (2013.01); *G05B 19/0423* (2013.01); *G06F 8/71* (2013.01); *H04L 12/40* (2013.01); *G05B 2219/2223* (2013.01); *G05B 2219/25049* (2013.01); *G05B 2219/25399* (2013.01); *H04L 2012/4026* (2013.01)

(58) Field of Classification Search
None
See application file for complete search history.

(56) References Cited

U.S. PATENT DOCUMENTS

| | | | | | |
|---|---|---|---|---|---|
| 5,535,377 | A | * | 7/1996 | Parks | ........................ H04L 7/02 713/400 |
| 5,914,996 | A | * | 6/1999 | Huang | .................... H03K 23/50 327/115 |
| 7,447,931 | B1 | * | 11/2008 | Rischar | .................. H04J 3/0697 368/46 |
| 7,979,730 | B2 | | 7/2011 | Fuehrer et al. | |
| 8,065,455 | B2 | * | 11/2011 | Hilscher | ................ H04L 12/407 710/104 |
| 2004/0141517 | A1 | | 7/2004 | Balasubramanian et al. | |
| 2009/0312855 | A1 | * | 12/2009 | Biehler | .............. G05B 19/0421 700/90 |
| 2013/0136197 | A1 | * | 5/2013 | Janicke | .............. G05B 19/0421 375/259 |
| 2013/0214598 | A1 | * | 8/2013 | Burke | ..................... G05B 15/02 307/31 |

FOREIGN PATENT DOCUMENTS

| | | |
|---|---|---|
| EP | 1527578 | 5/2005 |
| EP | 2133763 | 12/2009 |

\* cited by examiner

*Primary Examiner* — Isaac Tecklu
(74) *Attorney, Agent, or Firm* — Cozen O'Connor

(57) ABSTRACT

A method of operating an automation system cyclically communicating with a central unit in accordance with a send clock and a predetermined reduction ratio using a first cycle time, wherein the central unit uses a send clock SCC for its communication, and communicates with the automation device taking into account the send clock and a reduction ratio of the automation device, and wherein the send clock for the automation device is divided by the send clock of the central unit, the largest power-of-2 value smaller than the division result is selected and multiplied with the reduction ratio of the automation device resulting in a reduction ratio of the central unit for communicating with the automation device, and the reduction ratio of the automation device is used to step down the send clock of the central unit for cyclically communicating with the automation device using a second cycle time.

8 Claims, 2 Drawing Sheets

METHOD OF OPERATING AN AUTOMATION SYSTEM

BACKGROUND OF THE INVENTION

1. Field of the Invention

The present invention relates to an automation system and, more particularly, to a method of operating an automation system comprising an automation device connected for communication with a central unit.

2. Description of the Related Art

In an automation system, the automation units connected for communication and the central unit, or each central unit provided for their control, are intended for an automation solution and accordingly control and/or to monitor a respective technical process to be automated. As well as the communication users encompassed by the automation system, a significant component is the network provided to connect them for communication. To link it to this network, each communication user has a bus connection. In an automation system with an underlying network, e.g. Ethernet, Institute of Electrical and Electronic Engineers (IEEE) Standard 802.3, Wireless Local Access Network (WLAN) IEEE Standard 802.11 or CAN, in which the communication is handled, for example, by a communications protocol such as PROFINET, each device has a bus connection for connection to the network and a projected position of the respective device in a hierarchy of the automation system determines individual devices as masters (IO controller) and other devices as slaves (IO device). In an automation system, the central unit occupies a particular hierarchical position so that at least the central unit functions in the network as a master or IO controller. Examples of slaves, on the other hand, are periphery modules, sensors and actors with bus capabilities etc. which occupy a subordinate position in the hierarchy of the automation system compared to the central unit. Data is exchanged between IO controller and IO devices by means of cyclic real-time communication. For such real-time communication the continuous time is broken down into consecutive cyclic time segments of the same duration, meaning that the natural continuous time is thus discretized. These time segments are referred to below as send clocks. Communication users, i.e., IO controller and IO devices, which exchange data with each other with this type of cyclic real-time communication, previously had to be operated with the same send clock. This previously made it necessary for the central unit or each central unit, i.e., the IO controller or each IO controller, always to be operated with a send clock which is supported by all other automation devices (IO devices) encompassed by the automation system. Generally, the result of this is that, in system configurations in which devices support different send clocks, those system users that support faster/higher send clocks are not able to be operated with these faster/higher send clocks if users exist that do not support this send clock. Usually, newly developed IO controllers support more send clocks than the IO devices already included in an automation solution/an automation system, especially faster or higher send clocks. If a system operator wants to exploit the higher performance or the new IO controllers, until now an update, i.e. a firmware update, for example, has had to be performed on various IO devices or the IO devices themselves are to be replaced by newer IO devices with correspondingly improved communication capabilities.

European Patent EP 1527578 B1 and European Publication EP 2133763 A1 both disclose methods for communication between an IO controller and IO devices for the special case of integer ratios of the send clock of each of the IO devices and the send clock of the IO controller.

In large automation systems, especially with many different devices, the integer ratios named above are often difficult or even impossible to fulfill and the system has to be run very often in a non-optimum range and/or has to be slowed down drastically to properly work.

SUMMARY OF THE INVENTION

It is accordingly an object of the present invention to provide a method for operating an automation system in which the communication users included in the system are each able to be operated in accordance with their respective communication capabilities, so that on the one hand communication users already in use, with rather lower communication capabilities, are also able to be operated in conjunction with newer devices with improved communication performance, e.g., without the performance of the newer devices having to be reduced to a lowest common denominator.

This and other objects and advantages are achieved by a method for operating an automation system comprising an automation device connected for communication with a central unit, where the automation device cyclically communicates in accordance with a send clock $SC_D$ and a given or settable reduction ratio $RR_D$ using a cycle time $T_D = SC_D * RR_D$, and the central unit uses a send clock $SC_C$ for its communication, information about the send clock for the automation device is stored in a database of the central unit, and the central unit communicates with the automation device taking into account the send clock $SC_D$ and reduction ratio $RR_D$ of the automation device. In accordance with the method of the invention a) the send clock $SC_D$ for the automation device is divided by the send clock $SC_C$ of the central unit, this division resulting in a value $Q'$, b) the largest power-of-2 value $Q$ smaller than $Q'$ is chosen/selected and multiplied with the reduction ratio $RR_D$ of the automation device resulting in a reduction ratio $RR_{C-D}$ of the central unit for communicating with the automation device, and c) using the reduction ratio $RR_{C-D}$ to step down the send clock $SC_C$ of the central unit for cyclically communicating with the automation device using a cycle time $T_{C-D} = SC_C * RR_{C-D}$.

Using the method named above is especially advantageous, if the value $Q'$ is a non-power-of-2 value, meaning that $Q'$ cannot be expressed by 2 to a power of an integer number $\geq 0$ ($Q' \neq 2^n$ with n being an integer $\geq 0$). Q being a power-of-2 value means that Q can be expressed as $Q = 2^n$ with n being an integer $\geq 0$. In a preferred embodiment, there might be a maximum value of n (e.g., n=9 or n=10) for defining Q.

In a preferred embodiment, the central unit additionally supervises the communication received from the automation device, where an error action is performed after not receiving a communication message from the automation device within a time span being equal or longer than a central unit's watch dog factor $WDF_{C-D}$ multiplied by $T_{C-D}$, and where the watch dog factor $WDF_{C-D}$ is the smallest integer larger than a given or settable watch dog factor of the automation device $WDF_D$ multiplied with $T_D$ and divided by $T_{C-D}$.

According to the described method for calculating a reduction ratio of the central unit, it is possible to get an improved communication setup for communicating between the central unit and the automation device independent of the exact send clock values and ratio of both devices. In this way, it is not necessary to reduce the send clock values of the devices in the automation system to a lowest common value. The method described allows a considerably increase of the speed of communication between the central unit on the automation device compared to the conventional methods.

An automation device can be any device in an automation system like or comprising one or more actors or a sensors or robots or anything comparable or a combination of those devices. The central unit can be, for example, a controller, a computer, a programmable logic controller (PLC) or any electronic device for controlling a system.

The automation device has a send clock that gives a usually minimum cycle time for sending messages by the automation device. It is additionally possible to introduce a reduction ratio (which is usually an integer value; reduction ratios can also be integer powers of 2 ($2^n$ with n being an integer $\geq 0$)), i.e., the sent communication packets are not sent at each possible send clock time but only at a value given by the reduction ratio multiplied with the send clock time. This is, for example, sometimes necessary, to reduce the communication load in large automation systems.

The central unit also has a send clock that is usually the minimum cycle time for communicating messages to the automation devices in the automation system. It is also possible to set a reduction ratio in the central unit to extend the cycle times to integer multiples of the send clock time. Here, the reduction ratios can also be integers or powers of 2 ($2^n$ with n being an integer $\geq 0$). The usage of reduction ratios can, e.g., be done, for example, to reduce the communication load in an automation system or to adapt the communication of the central unit to a specific automation device, which is otherwise not able to receive messages in the basic cycle time of the central unit.

In a preferred embodiment of such communication, the reduction ratio of the central unit divided by the reduction ratio of the automation device can be a power of two, e.g., an element of the set (1, 2, 4, 8, 16, 32 . . . 128, 256, 512). By choosing a reduction ratio in accordance with the invention, a quite fast communication from the central unit to the automation device is possible also for non-perfectly fitting send clocks of both devices. The resulting communication may result in a none-perfect fitting of the central unit message cycle to the cycle time of the automation device. But since there is quite some tolerance while receiving messages, the system will still work properly.

In an additional embodiment, the central unit supervises the communication receive from the automation device. For this supervision, a "watch dog factor" is introduced that gives a number of controller-cycles, the central unit waits for a new message from the automation device until introducing a error action. Such error action can be, for example, giving a notice to a user of the system, stopping the communication-link to the automation device and/or re-starting a set up procedure to re-set-up the communication link between the central unit and the automation system or comparable actions known from the prior art.

The reduction ratio calculated according the method described above leads sometimes to an imperfect fitting of the cycle time of the central unit and the automation device. As a result, special care needs to be given to the watch dog factor used by the central unit to supervise the communication by the automation device. The disclosed embodiments of the method of the invention ensure that the supervision time given by the watch dog factor multiplied with the cycle time used for communication with the automation device is large enough to cover multiple send-cycles of the automation device.

In a preferred embodiment, the central device, the automation device and the communication in-between may be arranged and/or configured according to the ProfiNet or ProfiBus specifications, e.g., ProfiNet IO, at least among others.

The calculation of the reduction ratio for the central device and the watch dog factor of the central device for a special automation device in the automation system can be extended to a whole automation system comprising a plurality of automation devices connected for communication with the central unit. In this case, the central unit uses the calculation scheme for the reduction ratio and the watch dog factor according to this description for each automation device to adapt its communication to the respective device to the special properties of this device. That means that the central unit can use, if necessary, different values for the reduction ratio and the watch dog factor for each automation device, especially adapted to its properties.

The entire automation system named above can also be arranged and/or set-up according to the ProfiNet or ProfiBus specifications, e.g., ProfiNet IO, at least among others.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is further explained in more detail using the following example and referring to the figures, in which.

DETAILED DESCRIPTION OF THE PREFERRED EMBODIMENTS

Figure 1:
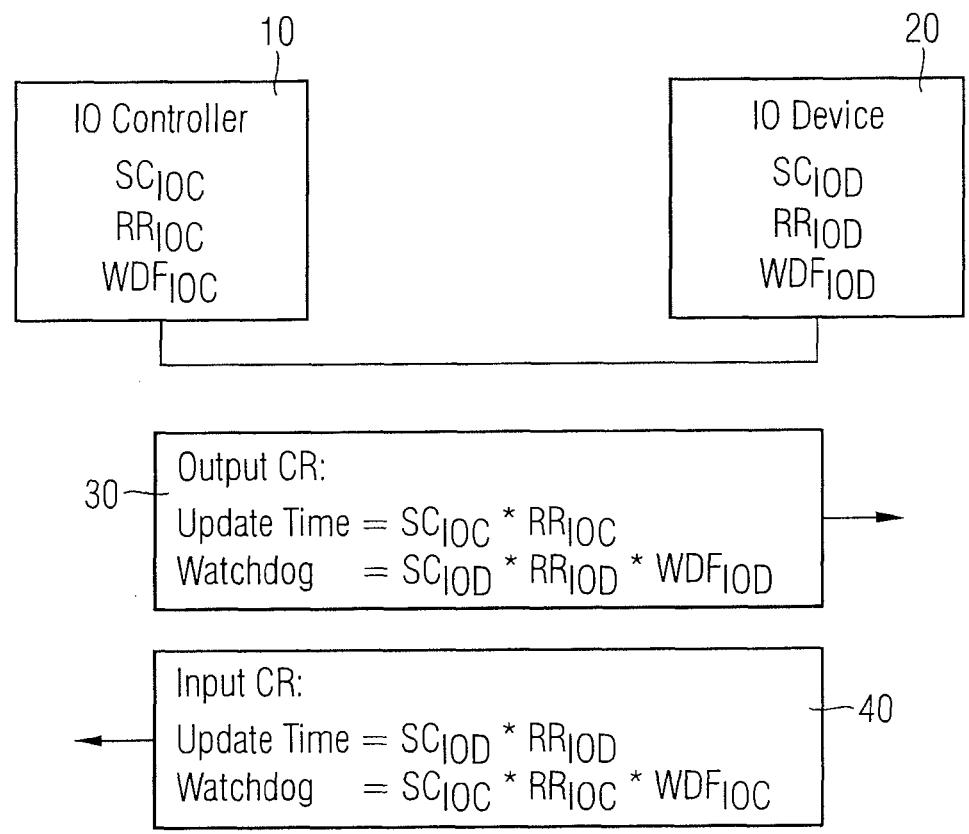
FIG. 1 is a block diagram of an exemplary system in accordance with the invention.

The exemplary system described and shown in FIG. 1 consists of an IO controller (10), which is an example for a central unit according to the present invention, where an a IO device is an example for an automation device (20) according to the disclosed invention.

The automation system shown in FIG. 1 and described below might, e.g., be configured according to the ProfiNet or ProfiBus, e.g., ProfiNet IO, specifications.

A contoller-connection-relationship 30 ("connection relationship" (CR)) is sent from the controller to the device and a device-connection-relationship 40 is send from the device to the controller.

A send clock ($SC_{IOC}$) of the IO controller 10 is set by an user either within a Domain Management—for IRT (IRT: isochronous real time, e.g., according to the ProfiNet or ProfiBus specifications) or within an IO system (for RT (RT: real time, e.g., according to the ProfiNet or ProfiBus specifications)).

A reduction ratio ($RR_{IOC}$) as being used by the IO controller 10 is determined by a send list control. For which the formulas are provided below.

A watchdog factor ($WDF_{IOC}$) as being used by the IO controller 10 is determined according to the formulas defined below.

A send clock of the IO device 20 ($SC_{IOD}$) is determined by a send list control; it is set to $SC_{IOC}$ if supported by the IO device 20

(Note: This results in equal output and input CR update and watchdog times.

Otherwise to the smallest supported even send clock from the IO device's 20 send clocks (comparable to even send clock adaption)

(Note: many devices support only the even send clock list for RT. An IO device often has to at least support 1000 μs as send clock.)

Or, if IO device 20 supports exactly one send clock, use this (Note: some devices with subordinated IRT system having an uneven send clock.

A reduction ratio of the 10 device 20 ($RR_{IOD}$) is set by a user (e.g. when using fixed value or factor) or by a send list control (e.g. when using "automatic").

A watchdog factor as being used by the IO device 20 ($WDF_{IOD}$) is set by a user (e.g., tab IO Cycle of the IO device's interface properties).

As stated above the following factors are determined:

| | |
|---|---|
| $SCF_{IOC}$ | by user |
| $SCF_{IOD}$ | see above |
| $RR_{IOD}$ | by user (fixed) or send list control (automatic) → dialog IO Cycle on IOD |
| $WDF_{IOD}$ | by user (default: 3) → dialog IO Cycle on IOD |

The following factors are quested

| | |
|---|---|
| $RR_{IOC}$ | see below |
| $WDF_{IOC}$ | see below |

Timing

As shown in FIG. 1, the input CR 40 and the output CR 30 follow the following timings.

The timings for the output CR 30 are defined as:

$$UpdateTime_{OutputCR} = SC_{IOC} * RR_{IOC}$$

$$WatchdogTime_{OutputCR} = SC_{IOD} * RR_{IOD} * WDF_{IOD}$$

The provider of the output CR 30 is the IO controller 10 and thus determines the update time. Its consumer is the IO device 20 and thus determines the watchdog time.

The timings for the input CR 40 are defined as:

$$UpdateTime_{InputCR} = SC_{IOD} * RR_{IOD}$$

$$WatchdogTime_{InputCR} = SC_{IOC} * RR_{IOC} * WDF_{IOC}$$

The provider of the input CR 40 is the IO device 20 and thus determines the update time. Its consumer is the IO controller 10 and thus determines the watchdog time.

Computation

Computing $RR_{IOC}$

The send list control plans for both input 40 and output CR 30 the bandwidth related to the IO controller's 10 view of the CR (i.e. $SCF_{IOC} * RR_{IOC}$); the IO device's 20 view of the CR must therefore adhere to the following equation so as not to overstress the bandwidth:

$$SC_{IOC} * RR_{IOC} \leq SC_{IOC} * RR_{IOD} \quad \text{Eq. (1)}$$

Transforming the equation leads to $$RR_{IOC} \leq \frac{SC_{IOD}}{SC_{IOC}} * RR_{IOD}$$

Since the reduction ratio has to be an element of the set {1, 2, 4, 8, 16, 32 ... 128, 256, 512}, the following algorithm rounds $RR_{IOC}$ down to the next fitting element of the set of reduction ratios:

$$RR_{IOC} = 2^{floor\left(log_2\left(\frac{SC_{IOD}}{SC_{IOC}}\right)\right)} * RR_{IOD}$$

Note that the following equations have to be taken into account to respect the IO device's 20 minimal device interval:

$$SC_{IOC} * RR_{IOC} \geq MinDeviceInterval \quad \text{Eq. (2)}$$

$$SC_{IOD} * RR_{IOD} \geq MinDeviceInterval \quad \text{Eq. (3)}$$

Using the knowledge from equation (1), it is enough to respect equation (2).

The user sets the update time based on IO device view onto send clock and reduction ratio (i.e., $SC_{IOD}$ and $RR_{IOD}$), thus the dialog has already to respect the MinDeviceInterval based on the setting of $SC_{IOC}$ and the $RR_{IOC}$ as computed according to equation (2).

However, changing the $SC_{IOC}$ at some later point may lead to a faster update of the output CR; the user then may have to change the update time of the IO device 20 (using fixed reduction ratio). This is detected in the consistency check by raising an error.

Computing $WDF_{IOC}$

The user is able to configure the watchdog factor on the IO device 20. Thus the watchdog time as seen by the user is based on the IO device's 20 view onto the CR.

$$WatchdogTime_{OutputCR} = SC_{IOD} * RR_{IOD} * WDF_{IOD}$$

Since the output CR is sent by the IO controller 10 more often than the IO device 20 expects it (since based on $SC_{IOC} * RR_{IOC}$), the watchdog timer works well.

In the opposite direction for the input CR, the $WDF_{IOC}$ has to be adapted, because the input CR is sent less often than the IO controller 10 expects its arrival. In extreme, the input CR is sent nearly half as often as expected by the IO controller 10 based on his timings.

It should be noted the assumption is that the minimum supported send clock of 1000 μs on the IO device 20 and a reduction ratio of 4 will lead in consequence to an update time of 4000 μs. Assume a send clock of 2125 μs on the IO controller 10 leads to a reduction ratio of 1 (according to the formula stated in chapter 0) and to an update time of 2125 μs.

Assume the watchdog factor set to default (3), resulting in a watchdog time of 12000 μs as stated to the user. If the IO controller 10 will blindly use the watchdog factor of 3 for computing the watchdog time, this would lead to a watchdog time of 6325 μs; actually near by the send interval of the input CR (4000 μs), just one lost frame will lead to a station loss in consequence.

Thus, the watchdog factor has to be adapted on the IO controller 10 with respect to the send interval of the input CR 40. Reading inputs in an automation task is not critical (in opposite to writing outputs). As a result, the following equation holds:

$$WatchdogTime_{InputCR} \geq WatchdogTime_{OutputCR}$$

In other words $$SC_{IOC}*RR_{IOC}*WDF_{IOC} \geq SC_{IOD}*RR_{IOD}*WDF_{IOD}$$

Transforming the equation leads to $$WDF_{IOC} \geq \frac{SC_{IOD}*RR_{IOD}*WDF_{IOD}}{SC_{IOC}*RR_{IOC}}$$

The watchdog factor is defined as an integer and has a mandatory range of 3-255. As a result, the following formula results:

$$WDF_{IOC} = \text{MIN}\left(\text{ceil}\left(\frac{SC_{IOD}*RR_{IOD}*WDF_{IOD}}{SC_{IOC}*RR_{IOC}}\right), 255\right) \quad \text{Eq. (4)}$$

Note that restricting the watchdog factor to a maximum of 255 is of no harm, because loosing 255 frames is in any event a strange occurrence.

Additionally, the resulting watchdog time has to follow the equation $$SC_{IOC}*RR_{IOC}*WDF_{IOC} \leq 1,92\ s$$

$WDF_{IOC}$ for even send clock adaption

Looking at equation (4) for WDFIOC in the context of the current PROFINET IO delivery stage, where only send clock adaption for even send clocks is defined, it is possible to derive the following:

Whenever the SCIOC and SCIOD are both even (i.e., out of the set {250 μs, 500 μs, 1000 μs, 2000 μs and 4000 μs}) the following equation holds:

$$SC_{IOC}*RR_{IOC} = SC_{IOD}*RR_{IOD}$$

By using this knowledge, equation (4) can be simplified as follows:

$$WDF_{IOC} = \text{MIN}\left(\text{ceil}\left(\frac{SC_{IOD}*RR_{IOD}*WDF_{IOD}}{SC_{IOC}*RR_{IOC}}\right), 255\right) = \text{MIN}(\text{ceil}(WDF_{IOD}), 255)$$

WDFIOD is defined as integer and has a maximum value of 255. Consequently, the equation can be further simplified to:

$$WDF_{IOC} = WDF_{IOD}$$

In other words: for even send clocks the watchdog factor used on the IO controller is identical to the one used on the IO device.

Figure 2:
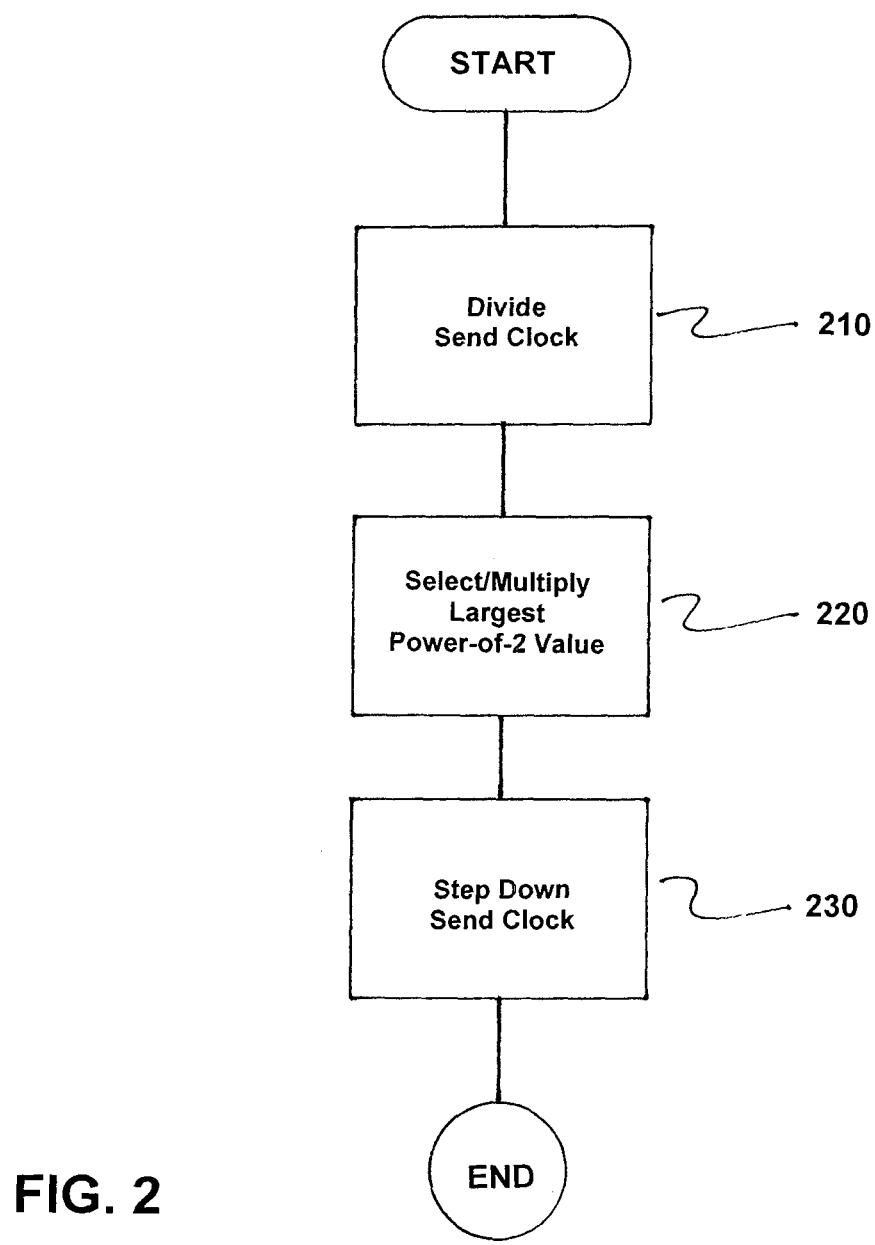
FIG. 2 is a flowchart of the method in accordance with the invention.

FIG. 2 is a flowchart of the method of operating an automation system comprising an automation device connected for communication with a central unit, where the automation device cyclically communicates in accordance with a send clock and a predetermined reduction ratio utilizing a first cycle time, and the central unit utilizes a send clock for its communication, stored in a database of the central unit information about the send clock for the automation device, and communicates with the automation device taking into account the send clock and the predetermined reduction ratio of the automation device.

The method comprises dividing the send clock for the automation device by the send clock of the central unit, a result of the division being a non-power-of-2 value, as indicated in step 210.

The largest power-of-2 value smaller than the result of the division and is selected and multiplied with a reduction ratio of the automation device to obtain a reduction ratio of the central unit for communicating with the automation device, as indicated in step 220.

The reduction ratio of the central unit then utilized to step down the send clock of the central unit for cyclically communicating with the automation device using a second cycle time, as indicated in step 230.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of operating an automation system comprising an automation device connected for communication with a central unit, the automation device cyclically communicating in accordance with a send clock and a predetermined reduction ratio utilizing a first cycle time, and the central unit utilizing a send clock for its communication, storing in a database of the central unit information about the send clock for the automation device, and communicating with the automation device taking into account the send clock and the predetermined reduction ratio of the automation device, the method comprising:
   a) dividing the send clock for the automation device by the send clock of the central unit, a result of the division being a non-power-of-2 value;
   b) selecting a largest power-of-2 value smaller than the result of the division and multiplying the selected largest power-of-2 value with a reduction ratio of the automation device to obtain a reduction ratio of the central unit for communicating with the automation device; and
   c) utilizing the reduction ratio of the central unit to step down the send clock of the central unit for cyclically communicating with the automation device using a second cycle time;
      wherein the central unit supervises communications received from the automation device, performs an error action after not receiving a communication message from the automation device within a time span equal or longer than a watch dog factor of the central unit multiplied by the second cycle time; and wherein the watch dog factor is a smallest integer larger than a predefined watch dog factor of the automation device multiplied by the first cycle time and divided by the second cycle time.

2. The method as claimed in claim 1, wherein the automation system comprises a plurality of automation devices connected for communication with the central unit.

3. The method as claimed in claim 1, wherein the database is an extract of a device-specific configuration file.

4. The method as claimed in claim 2, wherein the database is an extract of a device-specific configuration file.

5. The method as claimed in claim 3, wherein the device-specific configuration file is a result of a project planning of the central unit.

6. The method as claimed in claim 3, wherein the device-specific configuration file is a result of an initialization process when the automation system is started up.

7. A non-statutory non-volatile computer-readable medium storing a computer program with program code instructions executable by a computer, the program code instruction performing a method comprising:
   a) dividing a send clock for an automation device by a send clock of a central unit, a result of the division being a non-power-of-2 value;
   b) selecting a largest power-of-2 value smaller than the result of the division and multiplying the selected largest power-of-2 value with a reduction ratio of the automation device to obtain a reduction ratio of the central unit for communicating with the automation device; and
   c) utilizing the reduction ratio of the central unit to step down the send clock of the central unit for cyclically communicating with the automation device using a second cycle time;
      wherein the central unit supervises communications received from the automation device, performs an error action after not receiving a communication message from the automation device within a time span equal or longer than a watch dog factor of the central unit multiplied by the second cycle time; and
      wherein the watch dog factor is a smallest integer larger than a predefined watch dog factor of the automation device multiplied by a first cycle time and divided by the second cycle time.

8. A central unit of an automation system, a computer program being loaded on the central unit, the computer program having program code instructions executable by the central unit, the program code instruction performing a method comprising:
   a) dividing a send clock for an automation device by a send clock $SC_c$ of the central unit, a result of the division being a non-power-of-2 value;
   b) selecting a largest power-of-2 value smaller than the result of the division and multiplying a selected largest power-of-2 value with a reduction ratio of the automation device to obtain a reduction ratio of the central unit for communicating with the automation device; and
   c) utilizing the reduction ratio of the central unit to step down the send clock of the central unit for cyclically communicating with the automation device using a second cycle time;
      wherein the central unit supervises communications received from the automation device, performs an error action after not receiving a communication message from the automation device within a time span equal or longer than a watch dog factor of the central unit multiplied by the second cycle time; and
      wherein the watch dog factor is a smallest integer larger than a predefined watch dog factor of the automation device multiplied by a first cycle time and divided by the second cycle time.

* * * * *